US010635959B2

(12) United States Patent
Guo

(10) Patent No.: US 10,635,959 B2
(45) Date of Patent: Apr. 28, 2020

(54) GENERATING AUTHENTICATION IMAGE TO VERIFY A TWO-DIMENSIONAL CODE OFFLINE

(71) Applicant: Alibaba Group Holding Limited, George Town (KY)

(72) Inventor: Wei Guo, Hangzhou (CN)

(73) Assignee: Alibaba Group Holding Limited, George Town, Grand Cayman (KY)

( * ) Notice: Subject to any disclaimer, the term of this patent is extended or adjusted under 35 U.S.C. 154(b) by 88 days.

(21) Appl. No.: 15/894,761

(22) Filed: Feb. 12, 2018

(65) Prior Publication Data

US 2018/0232611 A1 Aug. 16, 2018

(30) Foreign Application Priority Data

Feb. 13, 2017 (CN) .......................... 2017 1 0076533

(51) Int. Cl.
*G06K 19/06* (2006.01)
*G06F 21/64* (2013.01)

(52) U.S. Cl.
CPC ....... *G06K 19/06103* (2013.01); *G06F 21/64* (2013.01); *G06K 19/06037* (2013.01)

(58) Field of Classification Search
CPC ............. G06K 19/06; G06K 19/06037; G06K 19/06009; G06K 19/06046; G06K 19/06103
See application file for complete search history.

(56) References Cited

U.S. PATENT DOCUMENTS 6,612,497 B1   9/2003 Iida et al.
9,390,358 B1 *  7/2016 Cheung ............ G06K 19/06103
(Continued)

FOREIGN PATENT DOCUMENTS

CN   103383738   11/2013
CN   103415007   11/2013
(Continued)

OTHER PUBLICATIONS

International Preliminary Report on Patentability in International Application No. PCT/US2018/018021, dated Jan. 22, 2019, 17 pages.
(Continued)

*Primary Examiner* — Thien M Le
*Assistant Examiner* — April A Taylor
(74) *Attorney, Agent, or Firm* — Fish & Richardson P.C.

(57) ABSTRACT

The present disclosure describes technologies related to generating authentication image to verify a two-dimensional (2D) code offline. In some implementations, a 2D code is parsed to identify a plurality of black pixels and a plurality of white pixels. A target image is parsed to identify a plurality of black pixels and a plurality of white pixels. The plurality of black pixels and the plurality of white pixels of the images are converted to a first plurality of binary arrays and a second plurality of binary arrays based on a predetermined rule. At least a portion of the first plurality of binary arrays and a portion of the second plurality of binary arrays are compared, and an authentication image including a plurality of black pixels, a plurality of white pixels, and a plurality of transparent pixels is generated based on comparison results.

20 Claims, 6 Drawing Sheets

(56) References Cited

U.S. PATENT DOCUMENTS

| | | | |
|---|---|---|---|
| 2009/0283589 A1 | 11/2009 | Moore et al. | |
| 2013/0035787 A1 | 2/2013 | Canter | |
| 2013/0301870 A1 | 11/2013 | Mow et al. | |
| 2014/0326793 A1* | 11/2014 | Windmueller | G06K 19/06037 235/494 |
| 2015/0324946 A1* | 11/2015 | Arce | G06T 1/0021 382/251 |
| 2016/0164991 A1* | 6/2016 | Zheng | H04L 51/08 709/219 |
| 2017/0185880 A1* | 6/2017 | Lin | G06K 19/06037 |
| 2019/0279059 A1* | 9/2019 | Feng | G06K 19/06037 |

FOREIGN PATENT DOCUMENTS

| | | |
|---|---|---|
| CN | 105095939 | 11/2015 |
| CN | 105280091 | 1/2016 |
| CN | 106372560 | 2/2017 |
| JP | 2011107605 | 6/2011 |
| JP | 2016035751 | 3/2016 |
| RU | 2477522 | 3/2013 |
| RU | 2536348 | 12/2014 |

OTHER PUBLICATIONS

International Search Report and Written Opinion in International Application No. PCT/US2018/018021, dated May 15, 2018, 12 pages.

Crosby et al., "BlockChain Technology: Beyond Bitcoin," Sutardja Center for Entrepreneurship & Technology Technical Report, Oct. 16, 2015, 35 pages.

Nakamoto, "Bitcoin: A Peer-to-Peer Electronic Cash System," www.bitcoin.org, 2005, 9 pages.

Fang, "Offline QR Code Authorization Based on Visual Cryptography," 7th International Conference on Intelligent Information Hiding and Multimedia Signal Processing, Oct. 2011, pp. 89-92.

Wan et al., "Visual Secret Sharing Scheme with (k, n) Threshold Based on QR Codes," 12th International Conference on Mobile AD-HOC and Sensor Networks (MSN), Dec. 2016, pp. 374-379.

Iioka et al, "A Method for Embedding QR Codes in Halftone Images", The Institute of Image Information and Television Engineers, Nov. 2013, 1 page (with English Abstract).

* cited by examiner

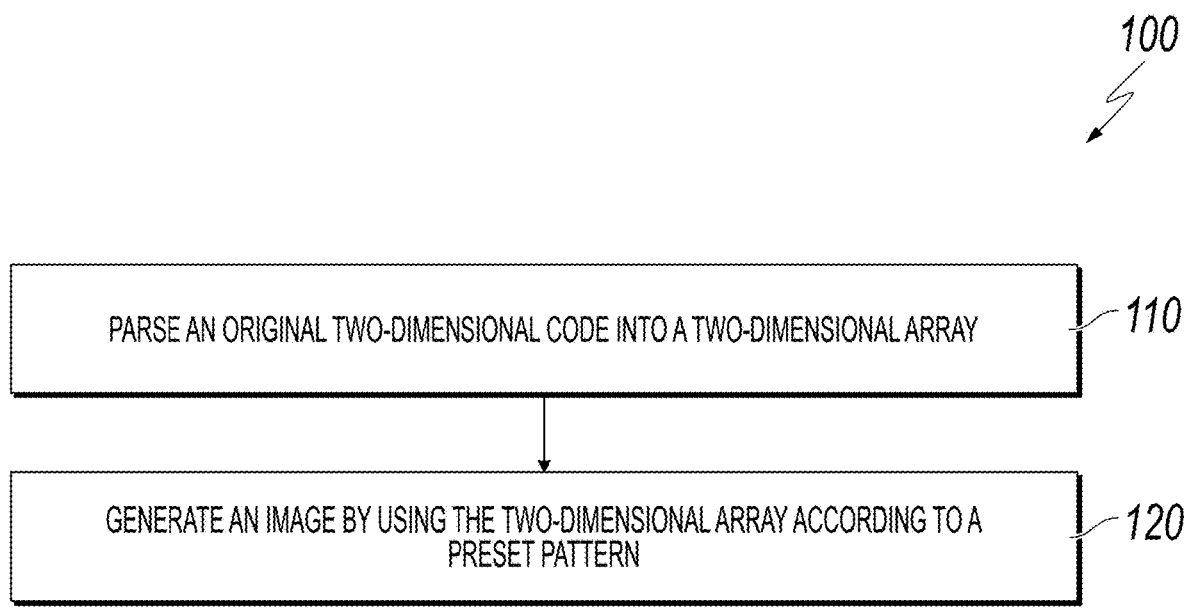
FIG. 1
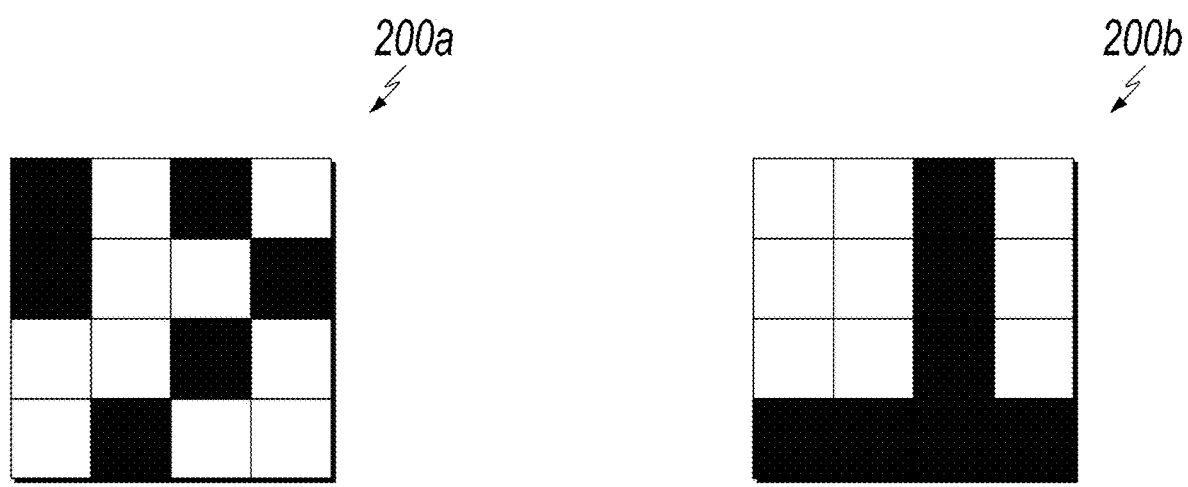
FIG. 2A                    FIG. 2B

GENERATING AUTHENTICATION IMAGE TO VERIFY A TWO-DIMENSIONAL CODE OFFLINE

This application claims priority to Chinese Patent Application No. 201710076533.1, filed on Feb. 13, 2017, which is incorporated by reference in its entirety.

TECHNICAL FIELD

This disclosure relates to data security and, more particularly, to quick response code generation.

BACKGROUND

A two-dimensional (2D) code, also known as a 2D barcode, or a quick response (QR) code can record data symbol information by using a bar and space alternating graph formed by a particular type of geometric graphs distributed on a 2D plane according to a particular rule. The 2D code has features including a large information capacity, a wide coding range, strong error tolerance, and high decoding reliability. 2D codes are also low-cost and easy to produce. As a result, 2D codes are widely used in people's lives.

With the development of the Internet and popularization of mobile devices, 2D codes can be seen everywhere in daily life. For example, a merchant can post a payment 2D code at a checkout, and a user can scan the payment 2D code by using a 2D code scanning function in an application. Or, in commodity promotion, a merchant can post an application downloading 2D code at relatively crowded places (such as a metro or a shopping mall), to attract people passing by to scan the 2D code and to download the application. Therefore, merchants or third parties need to provide authentic and valid 2D codes for users, and the users need an effective way to verify the 2D codes.

Currently, there is a risk that a 2D code printed by a merchant could be unknowingly replaced. However, as 2D codes are abstract, it is difficult for the merchant to recognize a replacement with the naked eye. The merchant could use a camera of a mobile phone or other device to determine whether the 2D code has been replaced. However, the mobile phone needs to access a network for a 2D code scan and determination. What is needed is the ability to verify the validity of a 2D code without a network connection.

The information above is merely presented as background information to help understand the present disclosure.

SUMMARY

A main objective of the present disclosure is to provide an image generation method and device, so as to solve the issue of verifying a two-dimensional (2D) code offline.

An aspect of the present disclosure provides an image generation method, including parsing an original 2D code into a 2D array, and generating an image by using the 2D array according to a preset pattern.

Another aspect of the present disclosure provides an image generation device, including a parsing unit configured to parse an original 2D code into a 2D array; and a generation unit configured to generate an image by using the 2D array according to a preset pattern.

Implementations of the present disclosure can generate an image by using an original 2D code based on a preset pattern, thereby verifying the original 2D code by using the image. In this way, it can be judged, when there is no network available, whether the 2D code has been tampered with. The present disclosure has abundant use scenarios, is not limited by networks or mobile terminals, and makes 2D code verification more interesting.

The present disclosure describes methods and systems, including computer-implemented methods, computer program products, and computer systems for generating authentication image to verify 2D code.

In an implementation, a 2D code is parsed to identify a plurality of black pixels and a plurality of white pixels. The plurality of black pixels and the plurality of white pixels of the 2D code are converted to a first plurality of binary arrays, wherein the plurality of black pixels and the plurality of white pixels correspond to different binary digits based on a predetermined rule. A target image is parsed to identify a plurality of black pixels and a plurality of white pixels, wherein the target image includes a predetermined pattern. The plurality of black pixels and the plurality of white pixels of the image are converted to a second plurality of binary arrays based on the predetermined rule. At least a portion of the first plurality of binary arrays and a portion of the second plurality of binary arrays are compared. A first plurality of binary digits of the at least a portion of the first plurality of binary arrays that are different from corresponding binary digits of the at least a portion of the second plurality of binary arrays are changed to same binary digits as the corresponding binary digits of the at least a portion of the second plurality of the binary arrays and converting the changed binary digits to a plurality of black pixels and a plurality of white pixels based on the predetermined rule. A second plurality of binary digits of the at least a portion of the first plurality of binary arrays that are same as corresponding binary digits of the at least a portion of the second plurality of binary arrays are changed to a plurality of transparent pixels, and an authentication image is formed using the plurality of black pixels, the plurality of white pixels, and the plurality of transparent pixels.

Implementations of the described subject matter, including the previously described implementation, can be implemented using a computer-implemented method; a non-transitory, computer-readable medium storing computer-readable instructions to perform the computer-implemented method; and a computer-implemented system comprising one or more computer memory devices interoperably coupled with one or more computers and having tangible, non-transitory, machine-readable media storing instructions that, when executed by the one or more computers, perform the computer-implemented method/the computer-readable instructions stored on the non-transitory, computer-readable medium.

The subject matter described in this specification can be implemented in particular implementations, so as to realize one or more of the following advantages. First, an authentication image can be generated to verify the 2D code offline, without connecting to a network. Second, authentication of the 2D code can be performed by a human by identifying an easily recognizable pattern. Third, the authentication process is interesting and provides good user experience.

The details of one or more implementations of the subject matter of this specification are set forth in the Detailed Description, the Claims, and the accompanying drawings. Other features, aspects, and advantages of the subject matter will become apparent to those of ordinary skill in the art from the Detailed Description, the Claims, and the accompanying drawings.

DESCRIPTION OF DRAWINGS

FIG. 1 is a flowchart of an image generation method, according to an implementation of the present disclosure.

FIGS. 2A-2C are schematic diagrams of processing a two-dimensional code, according to an implementation of the present disclosure.

Like reference numbers and designations in the various drawings indicate like elements.

DETAILED DESCRIPTION

Figure 2C:
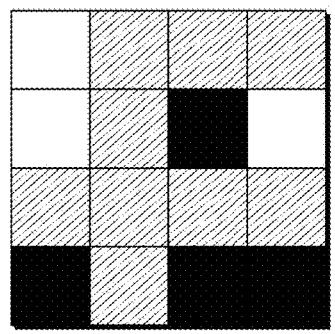

The following detailed description describes technologies related to verifying a two-dimensional code offline based on using an authentication image, and is presented to enable any person skilled in the art to make and use the disclosed subject matter in the context of one or more particular implementations. Various modifications, alterations, and permutations of the disclosed implementations can be made and will be readily apparent to those of ordinary skill in the art, and the general principles defined can be applied to other implementations and applications, without departing from the scope of the present disclosure. In some instances, one or more technical details that are unnecessary to obtain an understanding of the described subject matter and that are within the skill of one of ordinary skill in the art can be omitted so as to not obscure one or more described implementations. The present disclosure is not intended to be limited to the described or illustrated implementations, but to be accorded the widest scope consistent with the described principles and features.

To make the objectives, technical solutions, and advantages of the present disclosure clearer, the technical solutions of the present disclosure are described in further detail with reference to the specific implementations of the present disclosure and the corresponding drawings. The present disclosure is not meant to be limited to the described implementations, but to be considered applicable to the described subject matter as would be understood by one of ordinary skill in the art.

In the following, the implementations will be described in further detail with reference to the accompanying drawings. Identical reference numerals represent identical elements.

An image generation method provided in the implementations of the present disclosure can be executed by an image generation device, and the image generation device can be any electronic device having a computing and data processing function and a storage function. In the present disclosure, the electronic device can include, but is not limited to, any of the following devices having a display unit: a personal computer (PC), a mobile device (such as a cellular phone, a personal digital assistant (PDA), a digital camera, a portable game console, an MP3 player, a portable/personal multimedia player (PMP), a handheld electronic book, a tablet PC, a portable laptop PC, a global positioning system (GPS) navigator), a smart TV, and the like.

FIG. 1 is a flowchart showing an example of an image generation method 100, according to an implementation of the present disclosure. For clarity of presentation, the description that follows generally describes method 100 in the context of the other figures in this description. However, it will be understood that method 100 can be performed, for example, by any system, environment, software, and hardware, or a combination of systems, environments, software, and hardware, as appropriate. In some implementations, various steps of method 100 can be run in parallel, in combination, in loops, or in any order.

At 110, an original two-dimensional (2D) code is parsed into 2D arrays, where the 2D arrays are binary arrays that comprise '0's and '1's.

In some implementation, the 2D code uses a black-and-white matrix pattern to express binary data that comprise the '0's and '1' s. In other words, an encoding algorithm (such as, a Quick Response (QR) code algorithm) can be used to generate 2D data comprising '0's and '1's and to convert the 2D data into 2D code (for example, a QR code). For example, a value of 1 in the 2D data can be used to represent a black pixel, while a value of 0 in the 2D data can be used to represent a white pixel. Correspondingly, a black pixel can be used to represent the value 1, and a white pixel can be used to represent the value 0. As such, the 2D code can be parsed line by line and converted into 2D arrays comprising '0's and '1's.

It should be noted that the 2D code can be in the form of an electronic 2D code, or can be in the form of a physical 2D code printed based on the electronic 2D code. When the original 2D code in an electronic form, black pixels in the electronic 2D code can be represented by the value 1, and white pixels can be represented by the value 0. 2D arrays corresponding to the electronic 2D code can then be obtained according to this rule. If the 2D code is in the physical form, a corresponding electronic 2D code can be parsed and processed in the same manner as described earlier. Alternatively, an image of the physical 2D code can be captured, and then the image can be converted into a binary image to obtain corresponding 2D arrays.

It can be seen that the image generation method 100 based on the present disclosure can be used to generate an image corresponding to an electronic 2D code, as well as a corresponding physically printed 2D code if needed. For example, after electronically generating a 2D code, a merchant can generate an image pattern based on a predetermined pattern that corresponds to the electronic 2D code. Alternatively or additionally, after posting a physically printed 2D code on a bulletin board, the merchant can set a predetermined pattern, and generate a pattern based on the printed 2D code. As such, the 2D code in the bulletin board can be verified by using the generated pattern.

FIGS. 2A-2C are schematic diagrams of processing a two-dimensional code, according to an implementation of the present disclosure. As shown in FIG. 2A, FIG. 2A is an image showing an example original 2D code 200a. The original 2D code 200a can be parsed into 2D arrays as follows:

[1,0,1,0],
[1,0,0,1],
[0,0,1,0], and
[0,1,0,0].

Afterwards, at 120, an image is generated by using 2D arrays according to a predetermined pattern. The predetermined pattern can be a pattern predetermined by a user. In some implementations, the user can be a research and development staff member in a research and development phase, a technical staff member during secondary development, or an actual user of the 2D code. The predetermined pattern can be a simple pattern, easily recognizable by human eyes. For example, a smiling face or a piece of text. Preferably, the predetermined pattern is a black-and-white image, so that pixels in the image can be represented by binary values 0 and 1. Assuming that the predetermined pattern is a color image, the contour of the color image can be extracted according to a contour extraction algorithm. A contour line is represented with the value 1, and other areas are represented with the value 0. Alternatively, a color image can be converted into a grayscale image, and the grayscale image can be converted to a binary image.

Referring to FIG. 2B, FIG. 2B is an image showing an example of a predetermined pattern. Step 120 will now be described in detail with reference to FIG. 3.

Figure 3:
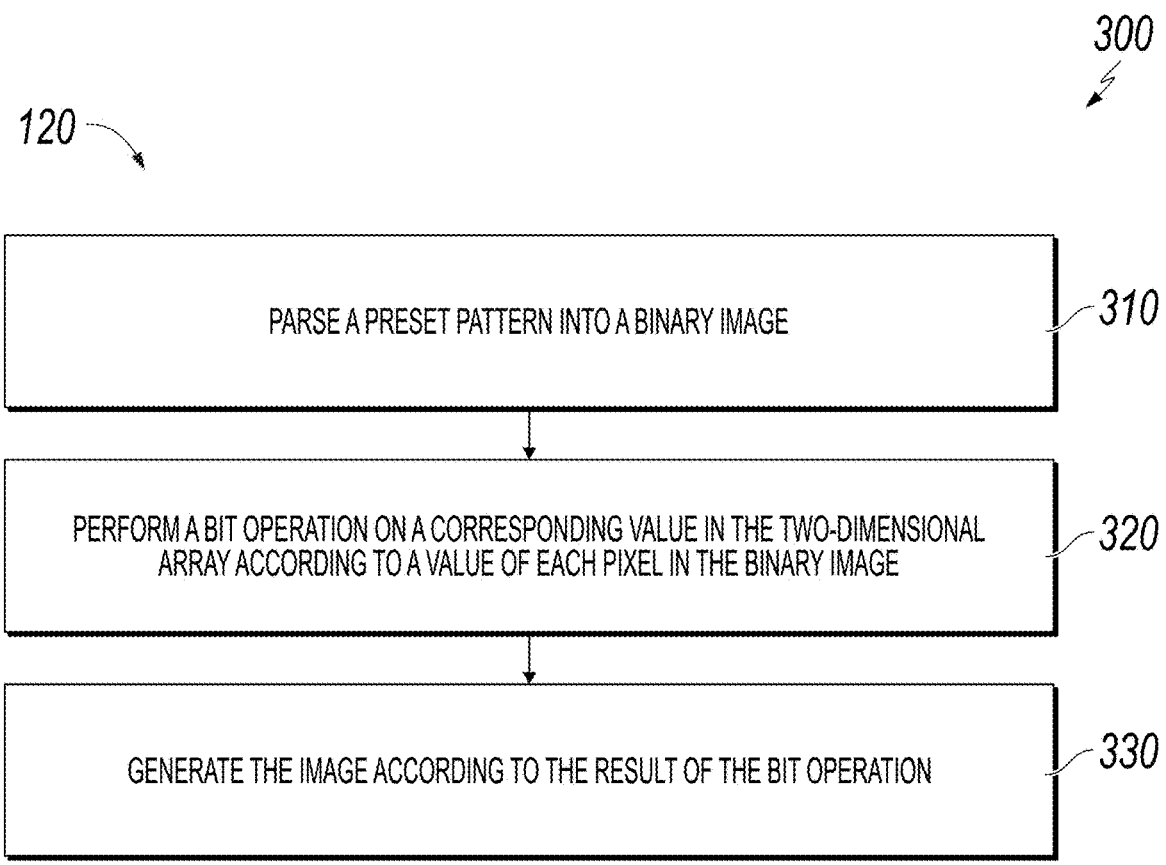
FIG. 3 is a detailed flowchart of step 120 in the image generation method of FIG. 1, according to an implementation of the present disclosure.

FIG. 3 is a detailed flowchart 300 of step 120 in the image generation method of FIG. 1, according to an implementation of the present disclosure. For clarity of presentation, the description that follows generally describes method 300 in the context of the other figures in this description. However, it will be understood that method 300 can be performed, for example, by any system, environment, software, and hardware, or a combination of systems, environments, software, and hardware, as appropriate. In some implementations, various steps of method 300 can be run in parallel, in combination, in loops, or in any order.

At 310, a predetermined pattern is parsed into a binary image. Optionally, the size of the predetermined pattern can be converted to be the same as the size of the original 2D code. If the sizes are different, the predetermined pattern can be scaled up or down correspondingly. For example, if the size of the predetermined pattern is 5×5, the predetermined pattern can be scaled up to 25×25, that is, each pixel is enlarged and represented by using 25 pixels having the same value. The size of the 2D code can also be scaled up or down, as required. As such, a bit operation can be performed on elements in a 2D matrix corresponding to the original 2D code, based on the predetermined pattern. Thus, the pattern in FIG. 2B can be parsed as follows:

[0,0,1,0],
[0,0,1,0],
[0,0,1,0], and
[1,1,1,1].

In other words, black pixels in the predetermined pattern can be parsed to be 1, and the white pixels can be parsed to be 0. As such, the predetermined pattern is parsed into a binary image. From 310, method 300 proceeds to 320.

At 320, a bit operation is performed on each element of the 2D arrays based on the pixel value of each pixel in the corresponding binary image. Specifically, assuming that a pixel value of a pixel in the binary image is 0, if the value of the corresponding element in the 2D array is 1, the corresponding value is changed to 0. If the value of the corresponding element in the 2D array is 0, the corresponding value is changed to null.

In the case that a pixel value of a pixel in the binary image is 1, if the value of the corresponding element in the 2D array is 1, the corresponding value is changed to null. Otherwise, if the value of the corresponding element in the 2D array is 0, the corresponding value is changed to 1. From 320, method 300 proceeds to 330.

At 330, the image is generated based on the result of the bit operation. Specifically, 2D arrays can be first generated based on the result of the bit operation. Then, the 2D array can be converted into an image according to the following rule: in the new 2D array, a value 0 of an element represents white color, a value null of an element represents transparency, and a value 1 of an element represents black color. For example, after a bit operation is performed on the original 2D code shown in FIG. 2A based on step S320, the following 2D arrays are generated:

[0, null, null, null],
[0, null, 1, 0],
[null, null, null, null], and
[1, null, 1, 1].

Subsequently, in the new 2D arrays, value 0 of an element represents white color, value null of an element represents transparency, and value 1 of an element represents black color. The 2D arrays described above can be converted into an image 200c, as shown in FIG. 2C.

In an alternative implementation, the image can be output to a transparent medium using an output device. For example, the image can be printed on a piece of transparent paper using a printer. The printed image can be used to overlap on the original 2D code. The original 2D code can then be verified by determining whether a pattern obtained after overlapping is the predetermined pattern. If the pattern obtained after the overlapping is the predetermined pattern, the original 2D code is determined to be unchanged. If the pattern obtained after the overlapping is not the predetermined pattern, it is determined that the original 2D code has been changed. A specific overlapping operation is discussed in detail in the description of FIGS. 4A-4C, hence it is not described here. After 300, method 300 stops.

Figure 4A:
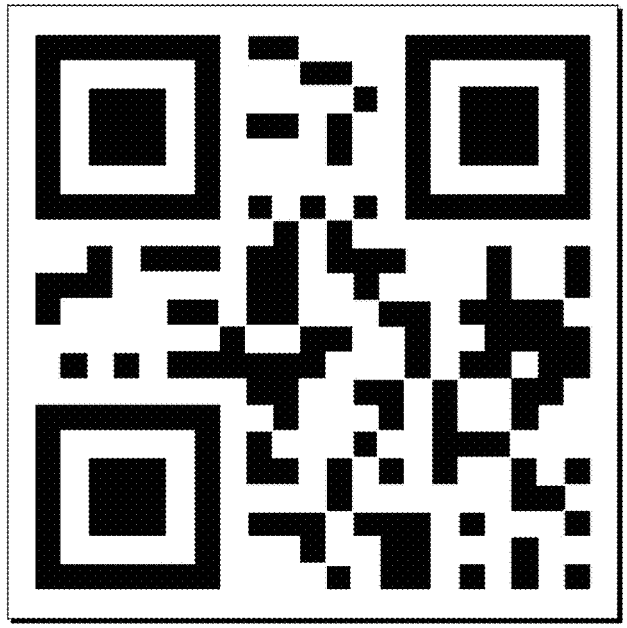
FIGS. 4A-4C are diagrams showing effects of applying an image generation method, according to an implementation of the present disclosure.
Figure 4B:
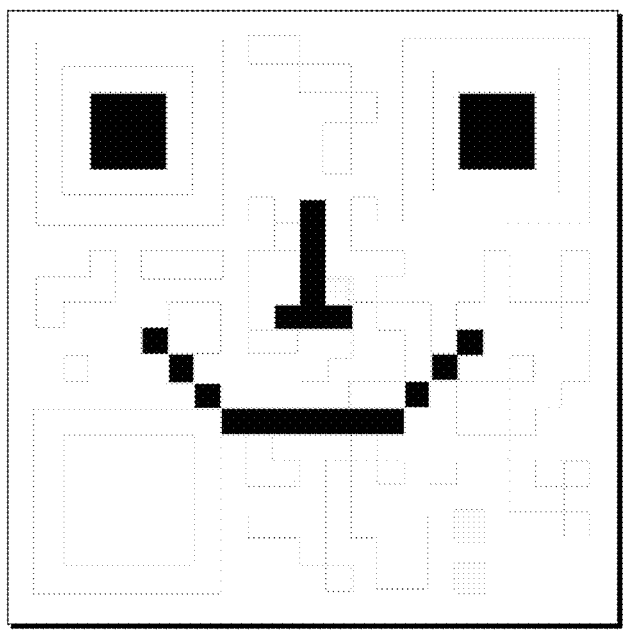
Figure 4C:
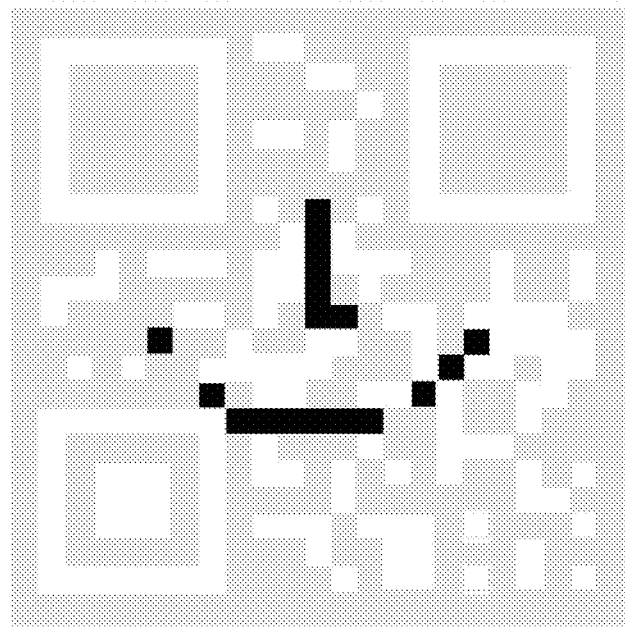

FIGS. 4A-4C are diagrams showing effects of applying an image generation method, according to an implementation of the present disclosure. As shown in FIGS. 4A-4C, FIGS. 4A-4C are diagrams showing effects of an image generation method, according to an implementation of the present disclosure. FIG. 4A shows an original 2D code 400a. The 2D code 400a can be an electronic 2D code, or can be a physical 2D code printed based on the electronic 2D code and posted outside. If the 2D code shown in FIG. 4A is an electronic 2D code, black color in the electronic 2D code is represented by the value 1, and white color is represented by the value 0 to obtain 2D arrays corresponding to the electronic 2D code. When the 2D code 400a shown in FIG. 4A is a physical 2D code, an electronic 2D code corresponding to the physical 2D code can be identified, and the electronic 2D code is processed as mentioned previously. Alternatively, an image of the 2D code can be captured, and the image of the 2D code can be converted to a binary image to obtain 2D arrays corresponding to the binary image.

It can be seen that the described image generation method, can not only can pre-generate an image corresponding to an electronic 2D code, but can also later generate an image corresponding to a physical 2D code, if needed.

Subsequently, a predetermined pattern can be determined. The pattern can be a pattern predetermined by a user according to user preferences. In this implementation, the predetermined pattern 400b is a smiling face as shown in FIG. 4B.

Then, an image 400c, as shown in FIG. 4C, is generated according to the image generation method of the present disclosure. In the pattern of image 400c, as shown in FIG. 4C, the gray color represents the value null, the black color represents the value 1, and the white color represents the value 0. As such, after the pattern in FIG. 4C is printed on a transparent material by using an output device, the printed material can be directly covered on the 2D code 400a shown in FIG. 4A. As such, in the 2D code image, the color at a position that corresponds to the gray color corresponding to null is not changed. In other words, if the color of a pixel in the 2D code 400*a* in FIG. 4A corresponding to value null is black, the color of the pixel is still black after direct coverage of the printed material. If the color of the pixel corresponding to value null is white, the color is still white after the coverage. Colors of pixel in FIG. 4A that correspond to black (value 1) pixels and white (value 0) pixels in FIG. 4C will be changed after covering FIG. 4C on FIG. 4A. Specifically, if a white pixel in FIG. 4A corresponds to a black pixel in FIG. 4C, the color of the corresponding pixel in the covered image is changed to black. If a black pixel in FIG. 4A corresponds to a white pixel in FIG. 4C, the color of the corresponding pixel in the covered image is changed to white.

As such, the 2D code in FIG. 4A can be verified by determining whether the pattern after coverage is a smiling face pattern. For example, if the pattern after the coverage is not a smiling face pattern, it can indicate that the 2D code has been tampered with, such as replaced or changed by others. If the pattern after the coverage is still a smiling face pattern, it indicates that the 2D code has not been changed.

As described above, the image generation method according to the present disclosure generates an image by using an original 2D code on the basis of a predetermined pattern, thereby verifying the original 2D code by using the generated image. As such, it can be determined offline whether the 2D code has been tampered with. The present disclosure has various use scenarios, is not limited by networks or mobile devices, and can make 2D code verification more interesting.

Figure 5:
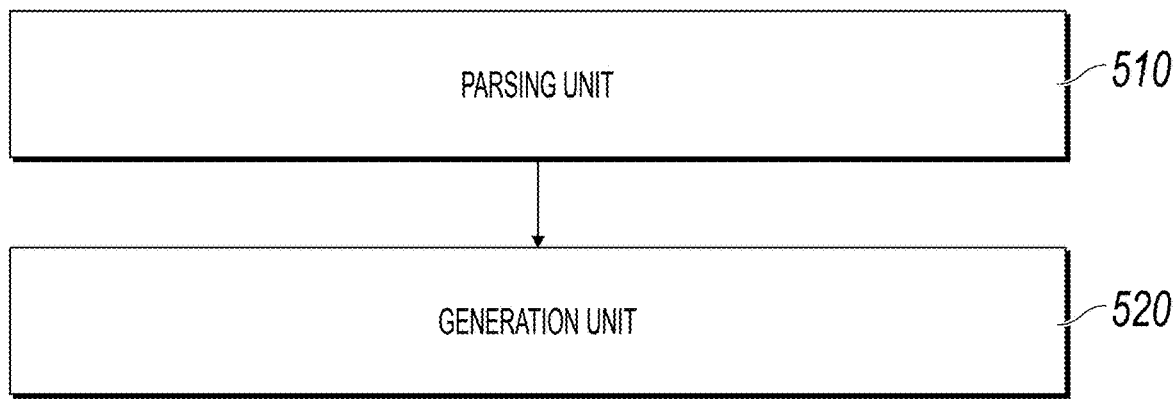
FIG. 5 is a block diagram of an image generation device, according to an implementation of the present disclosure.

FIG. 5 is a block diagram of an image generation device 500, according to an implementation of the present disclosure.

Those skilled in the art can understand that, the structure of the image generation device shown in FIG. 5 does not limit the electronic device of the present disclosure, and can include more or fewer components than those shown in the figure, or some components can be combined or a different component layout can be employed.

As shown in FIG. 5, the image generation device according to the implementation of the present disclosure includes a parsing unit 510 and a generation unit 520.

The parsing unit 510 is configured to parse an original 2D code into 2D arrays. The original 2D code can be an electronic 2D code, or can be a physical 2D code. If the original 2D code is an electronic 2D code, the black color in the 2D code is represented by a value 1, and the white color is represented by a value 0, thus obtaining 2D arrays corresponding to the original 2D code. If the 2D code is a physical 2D code, an electronic 2D code corresponding to the physical 2D code can be identified, and then the identified electronic 2D code is processed similarly. Alternatively, an image of the 2D code can be captured, and then the image of the 2D code can be converted into a binary image, thus obtaining 2D arrays corresponding to the binary image.

The generation unit 520 is configured to generate an image by using the 2D array according to a predetermined pattern. The predetermined pattern can be a pattern predetermined by a user.

In an alternative implementation, the generation unit 520 can include: a parsing sub-unit (not shown), an operation sub-unit (not shown) and a generation sub-unit (not shown). The parsing sub-unit is configured to parse the predetermined pattern into a binary image. The operation sub-unit is configured to perform a bit operation on a value of a corresponding element in the 2D array according to a pixel value of each pixel in the binary image. The generation sub-unit is configured to generate the image according to the result of the bit operation.

In an alternative implementation, before the performing the processing by using the foregoing sub-units, the generation unit 520 can be configured to convert the size of the predetermined pattern to be the same as the size of the original 2D code. If the sizes thereof are different, the predetermined pattern can be scaled up or down correspondingly.

In an alternative implementation, the operation sub-unit is configured to perform the bit operation on a value of a corresponding element in the 2D array according to the following steps: in a case where a pixel value of a pixel in the binary image converted from the predetermined pattern is 0, if the value of the corresponding element in the 2D array is 1, changing the corresponding value to 0, or if the value of the corresponding element in the 2D array is 0, changing the corresponding value to null, and in a case where a pixel value of a pixel in the binary image is 1, if the value of the corresponding element in the 2D array is 1, changing the corresponding value to null, or if the value of the corresponding element in the 2D array is 0, changing the corresponding value to 1.

In an alternative implementation, the generation sub-unit is configured to generate a new 2D array according to the result of the bit operation; and convert the new 2D array to the image according to the following rule: in the new 2D array, a value 0 of an element represents a white color, a value null of an element represents transparency, and a value 1 of an element represents a black color.

In an alternative implementation, the predetermined pattern can be generated by superimposing values at corresponding positions of the image and the original 2D code.

In an alternative implementation, the image output device includes an output unit (not shown). The output unit can output the image to a transparent carrier by using an output device.

For example, after the image is printed on a transparent material by using an output device, the printed material can be covered on the 2D code directly. As such, in the image of the 2D code, the color at a position that corresponds to the gray color corresponding to null is not changed. In other words, if the color of a pixel in the 2D code corresponding to null is black, the color of the pixel is still black after direct coverage of the printed material, and if the color of the pixel is white, the color thereof is still white after the coverage. The color of a position that corresponds to the white color corresponding to 0 or the black color corresponding to 1 will be changed. Specifically, if the color of a pixel in the 2D code corresponding to the black color (the color in the printed material) is white, the color of the pixel is black after direct coverage of the printed material; if the color of a pixel in the 2D code corresponding to the white color (the color in the printed material) is black, the color of the pixel is white after direct coverage of the printed material.

As such, the 2D code can be verified according to whether the pattern after the coverage is a pattern of a smiling face. For example, if the pattern after the coverage is not a smiling face pattern, it indicates that the 2D code has been tampered with, for example, replaced or changed by others. If the pattern after the coverage is still a smiling face pattern, it indicates that the 2D code has not been changed.

As described above, the image generation device, according to the present disclosure, generates an image by using an original 2D code on the basis of a predetermined pattern, thereby verifying the original 2D code by using the image.

As such, whether the 2D code is tampered with can be determined without having network connections. The present disclosure has various use scenarios, and is not limited by networks or mobile terminals.

Figure 6:
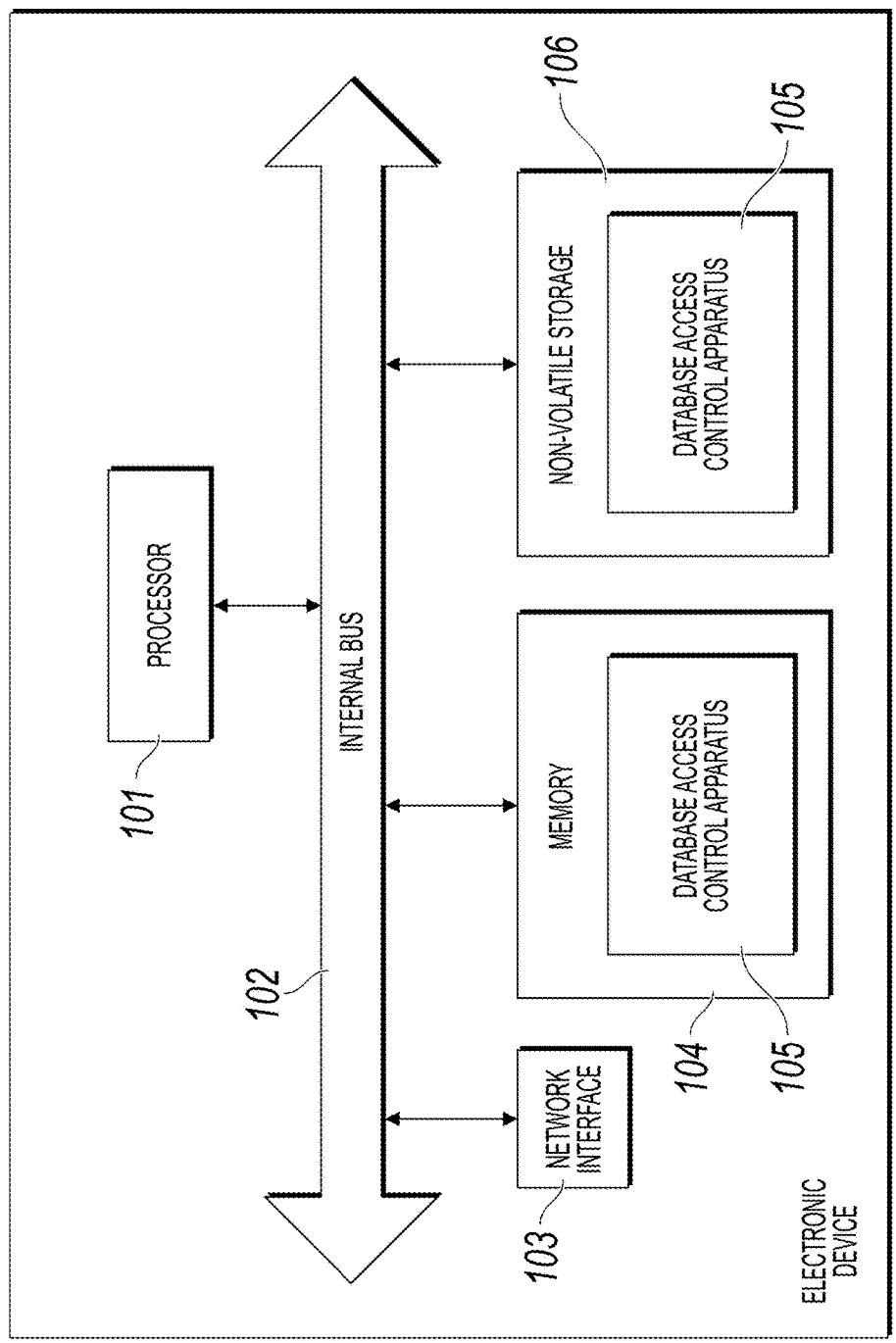
FIG. 6 is a block diagram of an electronic device, according to an implementation of the present disclosure.

FIG. 6 shows a block diagram of an electronic device 600 that executes an image generation algorithm according to an example implementation of the present disclosure. Referring to FIG. 6, at a hardware level, the electronic device includes a processor, an internal bus, a network interface, a memory, and a non-volatile storage. The electronic device can further include other hardware required by services. The processor reads a corresponding computer program from the non-volatile storage into the memory and runs the computer program, to form a webpage screenshot apparatus in a logic level. In addition to the software implementation, the present disclosure can include other implementations, such as logical devices or a software and hardware combined manner. In other words, the following processing procedure is not limited to being executed by various logical units, and can also be executed by hardware or logical devices.

In the 1990s, an improvement on a technology could obviously be distinguished as an improvement on hardware (for example, an improvement on a circuit structure such as a diode, a transistor, and a switch) or an improvement on software (an improvement on a method procedure). However, with the development of technologies, improvements of many method procedures at present can be considered as direct improvements on hardware circuit structures. Almost all designers program the improved method procedures into hardware circuits to obtain corresponding hardware circuit structures. Therefore, it is improper to assume that the improvement of a method procedure cannot be implemented by using a hardware entity module. For example, a Programmable Logic Device (PLD) (for example, a Field Programmable Gate Array (FPGA)) is such an integrated circuit whose logic functions are determined by devices programmed by a user. Designers program by themselves to "integrate" a digital system into a piece of PLD, without the need to ask a chip manufacturer to design and manufacture a dedicated integrated circuit chip. Moreover, at present, the programming is mostly implemented by using logic compiler software, instead of manually manufacturing an integrated circuit chip. The logic compiler software is similar to a software complier used for developing and writing a program, and original code before compiling also needs to be written by using a specific programming language, which is referred to as a Hardware Description Language (HDL). There are many types of HDLs, such as Advanced Boolean Expression Language (ABEL), Altera Hardware Description Language (AHDL), Confluence, Cornell University Programming Language (CUPL), HDCal, Java Hardware Description Language (JHDL), Lava, Lola, MyHDL, PALASM, and Ruby Hardware Description Language (RHDL), among which Very-High-Speed Integrated Circuit Hardware Description Language (VHDL) and Verilog are most commonly used now. Those skilled in the art also should know that a hardware circuit for implementing the logic method procedure can be easily obtained by slightly logically programming the method procedure using the above several hardware description languages and programming it into an integrated circuit.

A controller can be implemented in any suitable manner. For example, the controller can be in the form of, for example, a microprocessor or a processor and a computer readable medium storing computer readable program code (for example, software or firmware) executable by the (micro)processor, a logic gate, a switch, an Application Specific Integrated Circuit (ASIC), a programmable logic controller, and an embedded micro-controller. Examples of the controller include, but are not limited to, the following micro-controllers: ARC 625D, Atmel AT91SAM, Microchip PIC18F26K20, and Silicone Labs C8051F320. A memory controller can also be implemented as a part of control logic of a memory. Those skilled in the art also know that, the controller can be implemented by using pure computer readable program code, and in addition, the method steps can be logically programmed to enable the controller to implement the same function in a form of a logic gate, a switch, an application specific integrated circuit, a programmable logic controller and an embedded microcontroller. Therefore, this type of controller can be considered as a hardware component, and apparatuses included therein for implementing various functions can also be considered as structures inside the hardware component. Or, the apparatuses used for implementing various functions can even be considered as both software modules for implementing the method and structures inside the hardware component.

The system, apparatus, module or unit illustrated in the above implementations can be specifically implemented by using a computer chip or an entity, or a product having a certain function. A typical implementation device is a computer. Specifically, the computer can be, for example, a personal computer, a laptop computer, a cellular phone, a camera phone, a smart phone, a personal digital assistant, a media player, a navigation device, an email device, a game console, a tablet computer, a wearable device, or a combination of any of these devices.

For ease of description, when the apparatus is described, it is divided into various units in terms of functions for respective descriptions. As such, when the present disclosure is implemented, functions of the units can be implemented in the same or multiple pieces of software and/or hardware.

Those skilled in the art should understand that, the implementations of the present disclosure can be provided as a method, a system, or a computer program product. Therefore, the present disclosure can be implemented as a complete hardware implementation, a complete software implementation, or an implementation combining software and hardware. Moreover, the present disclosure can be a computer program product implemented on one or more computer usable storage media (including, but not limited to, a magnetic disk memory, a CD-ROM, an optical memory, and the like) including computer usable program code.

The present disclosure is described with reference to flowcharts and/or block diagrams according to the method, device (system) and computer program product according to the implementations of the present disclosure. It should be understood that a computer program instruction can be used to implement each process and/or block in the flowcharts and/or block diagrams and combinations of processes and/or blocks in the flowcharts and/or block diagrams. These computer program instructions can be provided for a general-purpose computer, a special-purpose computer, an embedded processor, or a processor of any other programmable data processing device to generate a machine, so that the instructions executed by a computer or a processor of any other programmable data processing device generate an apparatus for implementing a specified function in one or more processes in the flowcharts and/or in one or more blocks in the block diagrams.

These computer program instructions can also be stored in a computer readable memory that can instruct the computer or any other programmable data processing device to work in a particular manner, such that the instructions stored in the computer readable memory generate an artifact that includes an instruction apparatus. The instruction apparatus implements a specified function in one or more processes in the flowcharts and/or in one or more blocks in the block diagrams.

These computer program instructions can also be loaded onto a computer or another programmable data processing device, such that a series of operation steps are performed on the computer or another programmable device, thereby generating computer-implemented processing. Therefore, the instructions executed on the computer or another programmable device provide steps for implementing a specified function in one or more processes in the flowcharts and/or in one or more blocks in the block diagrams.

In a typical configuration, a computation device includes one or more central processing units (CPUs), an I/O interface, a network interface, and a memory.

The memory can include computer readable media such as a volatile memory, a Random Access Memory (RAM), and/or non-volatile memory, for example, Read-Only Memory (ROM) or flash RAM. The memory is an example of a computer readable medium.

The computer readable medium includes non-volatile and volatile media as well as movable and non-movable media, and can implement information storage by means of any method or technology. Information can be a computer readable instruction, a data structure, and a module of a program or other data. A storage medium of a computer includes, for example, but is not limited to, a phase change memory (PRAM), a static random access memory (SRAM), a dynamic random access memory (DRAM), other types of RAMs, a ROM, an electrically erasable programmable read-only memory (EEPROM), a flash memory or other memory technologies, a compact disk read-only memory (CD-ROM), a digital versatile disc (DVD) or other optical storages, a cassette tape, a magnetic tape/magnetic disk storage or other magnetic storage devices, or any other non-transmission medium, and can be used to store information accessed by the computing device. According to the definition of this text, the computer readable medium does not include transitory media, such as a modulated data signal and a carrier.

It should be further noted that, the term "include", "comprise" or other variations thereof are intended to cover non-exclusive inclusion, so that a process, method, commodity or device including a series of elements not only includes the elements, but also includes other elements not clearly listed, or further includes inherent elements of the process, method, commodity or device. In a case without any more limitations, an element defined by "including a/an . . . " does not exclude that the process, method, commodity or device including the element further has other identical elements.

Those skilled in the art should understand that, the implementations of the present disclosure can be provided as a method, a system, or a computer program product. Therefore, the present disclosure can be implemented as a complete hardware implementation, a complete software implementation, or an implementation combining software and hardware. Moreover, the present disclosure can be in the form of a computer program product implemented on one or more computer usable storage media (including, but not limited to, a magnetic disk memory, a CD-ROM, an optical memory and the like) including computer usable program code.

The present disclosure can be described in a common context of a computer executable instruction executed by a computer, for example, a program module. Generally, the program module includes a routine, a program, an object, an assembly, a data structure, and the like used for executing a specific task or implementing a specific abstract data type. The present disclosure can also be implemented in distributed computing environments, and in the distributed computer environments, a task is executed by using remote processing devices connected through a communications network. In the distributed computer environment, the program module can be located in local and remote computer storage media including a storage device.

The implementations in the specification are described progressively, identical or similar parts of the implementations can be obtained with reference to each other, and each implementation emphasizes a part different from other implementations. Especially, the system implementation is basically similar to the method implementation, so it is described simply, and for related parts, reference can be made to the descriptions of the parts in the method implementation.

The above descriptions are merely implementations of the present disclosure, and are not intended to limit the present disclosure. For those skilled in the art, the present disclosure can have various modifications and variations. Any modification, equivalent replacement, improvement or the like made without departing from the spirit and principle of the present disclosure should all fall within the scope of claims of the present disclosure.

Figure 7:
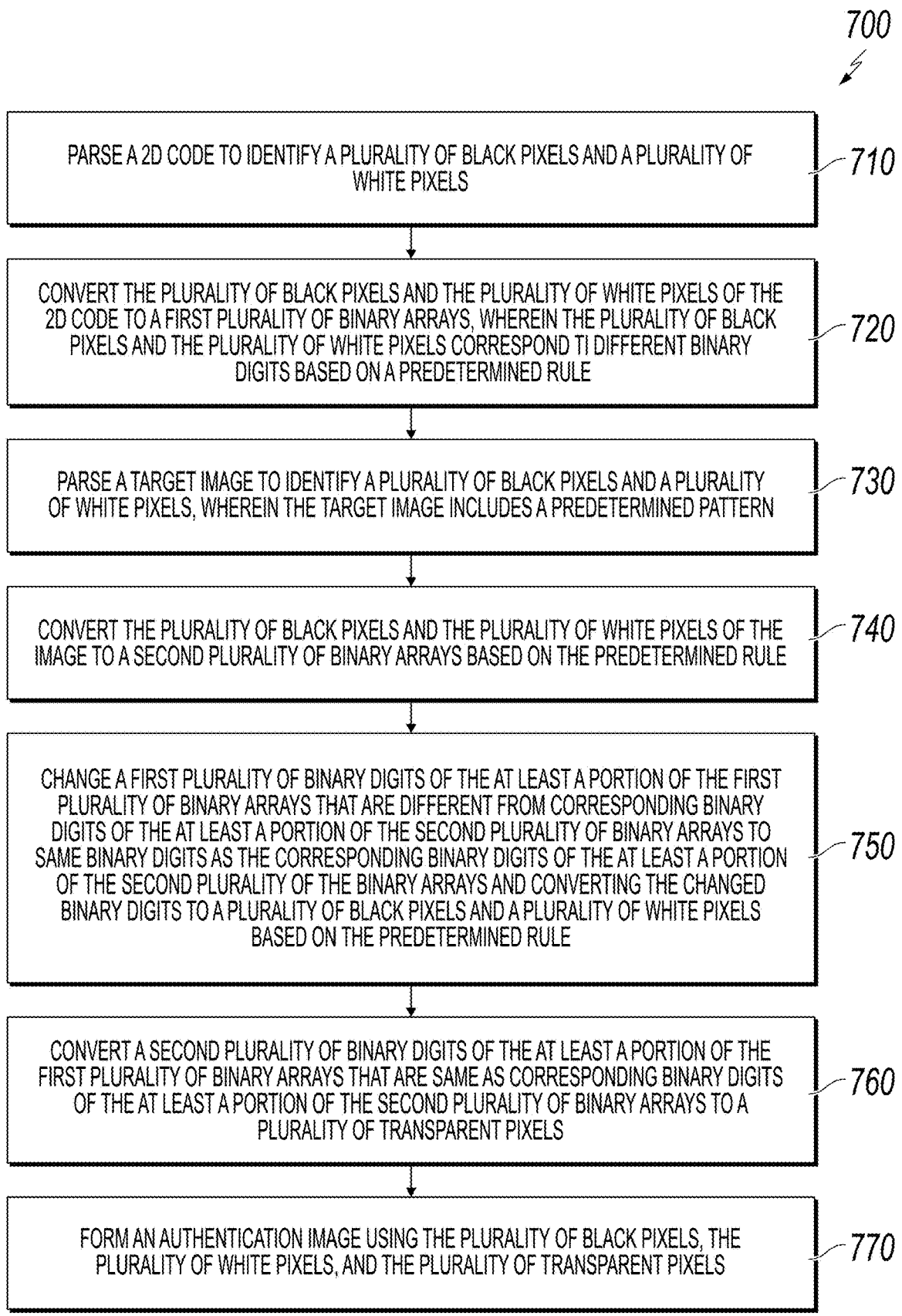
FIG. 7 is a flowchart illustrating an example of a computer-implemented method for generating an image pattern for verifying a 2D code, according to an implementation of the present disclosure.

FIG. 7 is a flowchart illustrating an example of a computer-implemented method 700 for generating an image pattern for verifying a 2D code, according to an implementation of the present disclosure. For clarity of presentation, the description that follows generally describes method 700 in the context of the other figures in this description. However, it will be understood that method 700 can be performed, for example, by any system, environment, software, and hardware, or a combination of systems, environments, software, and hardware, as appropriate. In some implementations, various steps of method 700 can be run in parallel, in combination, in loops, or in any order.

At 710, a 2D code is parsed to identify a plurality of black pixels and a plurality of white pixels. For example, FIG. 2A shows an example 2D code. Black and white pixels can be represented by black and white squares shown in FIG. 2A. From 710, method 700 proceeds to 720.

At 720, the plurality of black pixels and the plurality of white pixels of the 2D code are converted to a first plurality of binary arrays, wherein the plurality of black pixels and the plurality of white pixels correspond to different binary digits based on a predetermined rule. For example, a first predetermined rule can be converting black pixels to the binary digit "1" and converting white pixels to the binary digit "0." A second predetermined rule can be converting black pixels to the binary digit "0" and converting white pixels to the binary digit "1." Using the first predetermined rule as an example, the 2D code shown in FIG. 2A can be converted to the following binary arrays:

[1,0,1,0],
[1,0,0,1],
[0,0,1,0], and
[0,1,0,0].

In some cases, each binary array can correspond to a line of pixels in the 2D code and each binary digit in the binary array can have a one-to-one correspondence with the corresponding pixel in the 2D code. From 720, method 700 proceeds to 730.

At 730, a target image is parsed to identify a plurality of black pixels and a plurality of white pixels. A target image can be an image that includes a predetermined pattern that is easily recognizable, such as a letter, a smiley face, or other regular shapes. In some cases, the total number of pixels identified by parsing the target image is the same as the number of pixels in the 2D code. In some cases, the total number of pixels identified by parsing the target image can be different from the number of pixels in the 2D code. The pixels in the target image can then be down-converted or up-converted to match the number of pixels in the 2D code. For example, if the 2D code is composed of 5×5 pixels, but the target image is composed of 25×25 pixels, the target image can be down-converted to a similar pattern composed of 5×5 pixels. From 730, method 700 proceeds to 740.

At 740, the plurality of black pixels and the plurality of white pixels of the target image are converted to a second plurality of binary arrays based on the predetermined rule. In other words, the plurality of black pixels of the target image are converted to a same binary digit as the plurality of black pixels of the 2D code and the plurality of white pixels of the are image are converted to a same binary digit as the plurality of white pixels of the 2D code based on the predetermined rule. Using the image shown in FIG. 2B as an example target image 200b, the image has a predetermined pattern of 4×4 black and white pixels. Assume that the predetermined rule is to convert black pixels to the binary digit "1" and to convert white pixels to the binary digit "0," the pixels in the image are then converted to the following binary arrays:

[0,0,1,0],
[0,0,1,0],
[0,0,1,0], and
[1,1,1,1].

The binary arrays converted from the target image is used to generate an authentication image that can be used to verify the authenticity of the 2D code. From 740, method 700 proceeds to 750.

At 750, at least a portion of the first plurality of binary arrays and a portion of the second plurality of binary arrays are compared. For example, the binary arrays converted from the 2D code 200a as shown in FIG. 2A can be compared with the binary arrays converted from the target image 200b shown in FIG. 2B. The comparison can be bit-by-bit. That is, each binary digit in the binary arrays converted from 200a is compared with a corresponding binary digit at the same position in the binary arrays converted from 200b. For example, considering both binary arrays as 4×4 matrix, then each element in the first matrix is compared with a corresponding element in the second matrix that has the same line and column number.

At 750, a first plurality of binary digits of the at least a portion of the first plurality of binary arrays that are different from corresponding binary digits of the at least a portion of the second plurality of binary arrays are changed to same binary digits as the corresponding binary digits of the at least a portion of the second plurality of the binary arrays and the changed binary digits are converted to a plurality of black pixels and a plurality of white pixels based on the predetermined rule. To generate an authentication image to authenticate the 2D code, a data array can be derived from first binary arrays corresponding to the 2D code by comparing with second binary arrays corresponding to the target image. If a binary digit in the first binary arrays is different from the corresponding binary digit in the second binary arrays, the binary digit in the first binary arrays is changed to the same as the corresponding binary digit in the second binary arrays. In some cases, data arrays corresponding to the authentication image can be directly generated by comparing the first binary arrays with the second binary arrays. In such cases, when a binary digit in the first binary arrays is different from a corresponding binary digit in the second binary arrays, the binary digit in the second binary arrays is adopted to fill the corresponding position in the data arrays. From 750, method 700 proceeds to 760.

At 760, a second plurality of binary digits of the at least a portion of the first plurality of binary arrays that are same as corresponding binary digits of the at least a portion of the second plurality of binary arrays are converted to a plurality of transparent pixels. In some cases, when a binary digit in the first binary arrays is the same as a corresponding binary digit in the second binary arrays, the corresponding position in the data arrays can be filled with a "null" value, which in turn, can be converted to a transparent pixel. In other words, if a pixel in the 2D code has the same color as the corresponding pixel in the target image, the pixel can be converted to a transparent pixel in the authentication image. From 760, method 700 proceeds to 770.

At 770, an authentication image is formed using the plurality of black pixels, the plurality of white pixels and the plurality of transparent pixels. The authentication image formed by the plurality of black, white, and transparent pixels can have the same number of the pixels as the 2D code. Each pixel in the authentication image can have a one-to-one correspondence with the 2D code. It can be understood that the authentication image can be directly covered or overlapped on the 2D code. The overlapped image is the target image (or a down-converted or up-converted target image that matches the pixels of the 2D code) if the 2D code is untampered. Otherwise, the 2D code may be tampered or modified. Therefore, the authentication image can be used to authenticate the 2D code.

If the 2D code is in an electronic form, the authentication image can be electronic generated and applied to the 2D code to reveal the overlapped to image to a viewer. If the 2D code is in a printed form, a physical copy of the authentication image can be provided to a user and directly covered on the 2D code to reveal the overlapped image. Because the target image is selected to have an easily recognizable pattern, a user can easily identify whether the 2D code is tampered with by recovering the target image using the authentication image. The authentication process can be performed either online or offline. After 770, process 700 ends.

While this specification contains many specific implementation details, these should not be construed as limitations on the scope of any inventive concept or on the scope of what can be claimed, but rather as descriptions of features that can be specific to particular implementations of particular inventive concepts. Certain features that are described in this specification in the context of separate implementations can also be implemented, in combination, in a single implementation. Conversely, various features that are described in the context of a single implementation can also be implemented in multiple implementations, separately, or in any sub-combination. Moreover, although previously described features can be described as acting in certain combinations and even initially claimed as such, one or more features from a claimed combination can, in some cases, be excised from the combination, and the claimed combination can be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations can be considered optional), to achieve desirable results. In certain circumstances, multitasking or parallel processing (or a combination of multitasking and parallel processing) can be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, that is, one or more modules of computer program instructions, encoded on non-transitory computer storage media for execution by, or to control the operation of, data processing apparatus. Alternatively or in addition, the program instructions can be encoded on an artificially-generated propagated signal, for example, a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (for example, multiple Compact Discs (CDs), Digital Video Discs (DVDs), magnetic disks, or other storage devices).

The operations described in this specification can be implemented as operations performed by a data processing apparatus on data stored on one or more computer-readable storage devices or received from other sources.

The term "real-time," "real time," "realtime," "real (fast) time (RFT)," "near(ly) real-time (NRT)," "quasi real-time," or similar terms (as understood by one of ordinary skill in the art), means that an action and a response are temporally proximate such that an individual perceives the action and the response occurring substantially simultaneously. For example, the time difference for a response to display (or for an initiation of a display) of data following the individual's action to access the data can be less than 1 millisecond (ms), less than 1 second (s), or less than 5 s. While the requested data need not be displayed (or initiated for display) instantaneously, it is displayed (or initiated for display) without any intentional delay, taking into account processing limitations of a described computing system and time required to, for example, gather, accurately measure, analyze, process, store, or transmit the data.

The terms "data processing apparatus," "computer," or "computing device" encompass all kinds of apparatus, devices, and machines for processing data, including by way of example a programmable processor, a computer, a system on a chip, or multiple ones, or combinations, of the foregoing. The apparatus can include special purpose logic circuitry, for example, a central processing unit (CPU), a field programmable gate array (FPGA) or an application-specific integrated circuit (ASIC). The apparatus can also include, in addition to hardware, code that creates an execution environment for the computer program in question, for example, code that constitutes processor firmware, a protocol stack, a database management system, an operating system (for example, LINUX, UNIX, WINDOWS, MAC OS, ANDROID, IOS, another operating system, or a combination of operating systems), a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, software module, software unit, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program can, but need not, correspond to a file in a file system. A program can be stored in a portion of a file that holds other programs or data (for example, one or more scripts stored in a markup language document), in a single file dedicated to the program in question, or in multiple coordinated files (for example, files that store one or more modules, sub-programs, or portions of code). A computer program can be deployed to be executed on one computer or on multiple computers that are located at one site or distributed across multiple sites and interconnected by a communication network.

Processors suitable for the execution of a computer program include, by way of example, both general- and special-purpose microprocessors, and any one or more processors of any kind of digital computer. Generally, a processor will receive instructions and data from a read-only memory or a random-access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, for example, magnetic, magneto-optical disks, or optical disks. However, a computer need not have such devices. Moreover, a computer can be embedded in another device, for example, a mobile device, a personal digital assistant (PDA), a game console, a Global Positioning System (GPS) receiver, or a portable storage device (for example, a universal serial bus (USB) flash drive), to name just a few. Devices suitable for storing computer program instructions and data include all forms of non-volatile memory, media and memory devices, including, by way of example, semiconductor memory devices, for example, erasable programmable read-only memory (EPROM), electrically-erasable programmable read-only memory (EEPROM), and flash memory devices; magnetic disks, for example, internal hard disks or removable disks; magneto-optical disks; and CD-ROM and DVD-ROM disks. The processor and the memory can be supplemented by, or incorporated in, special-purpose logic circuitry.

Mobile devices can include mobile telephones (for example, smartphones), tablets, wearable devices (for example, smart watches, smart eyeglasses, smart fabric, smart jewelry), implanted devices within the human body (for example, biosensors, smart pacemakers, cochlear implants), or other types of mobile devices. The mobile devices can communicate wirelessly (for example, using radio frequency (RF) signals) to various communication networks (described below). The mobile devices can include sensors for determining characteristics of the mobile device's current environment. The sensors can include cameras, microphones, proximity sensors, GPS sensors, motion sensors, accelerometers, ambient light sensors, moisture sensors, gyroscopes, compasses, barometers, fingerprint sensors, facial recognition systems, RF sensors (for example, Wi-Fi and cellular radios), thermal sensors, or other types of sensors. For example, the cameras can include a forward- or rear-facing camera with movable or fixed lenses, a flash, an image sensor, and an image processor. The camera can be a megapixel camera capable of capturing details for facial and/or iris recognition. The camera along with a data processor and authentication information stored in memory or accessed remotely can form a facial recognition system. The facial recognition system or one-or-more sensors, for example, microphones, motion sensors, accelerometers, GPS sensors, or RF sensors, can be used for user authentication.

To provide for interaction with a user, embodiments of the subject matter described in this specification can be implemented on a computer having a display device and an input device, for example, a liquid crystal display (LCD) or organic light-emitting diode (OLED)/virtual-reality (VR)/augmented-reality (AR) display for displaying information to the user and a touchscreen, keyboard, and a pointing device, for example, a mouse or a trackball, by which the user can provide input to the computer. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented using computing devices interconnected by any form or medium of wireline or wireless digital data communication (or combination thereof), for example, a communication network. Examples of communication networks include a local area network (LAN), a radio access network (RAN), a metropolitan area network (MAN), and a wide area network (WAN). The communication network can include all or a portion of the Internet, another communication network, or a combination of communication networks. Information can be transmitted on the communication network according to various protocols and standards, including Worldwide Interoperability for Microwave Access (WIMAX), Long Term Evolution (LTE), Code Division Multiple Access (CDMA), 5G protocols, IEEE 802.11 a/b/g/n or 802.20 protocols (or a combination of 802.11x and 802.20 or other protocols consistent with the present disclosure), Internet Protocol (IP), Frame Relay, Asynchronous Transfer Mode (ATM), ETHERNET, or other protocols or combinations of protocols. The communication network can transmit voice, video, biometric, or authentication data, or other information between the connected computing devices.

Embodiments of the subject matter described in this specification can be implemented using clients and servers interconnected by a communication network. A client and server are generally remote from each other and typically interact through a communication network. The relationship of client and server arises by virtue of computer programs running on the respective computers and having a client-server relationship to each other. A client, for example, a mobile device, can carry out transactions itself, with a server, or through a server, for example, performing buy, sell, pay, give, send, or loan transactions, or authorizing the same.

While this specification contains many specific implementation details, these should not be construed as limitations on the scope of the disclosure and what is claimed. Certain features that are described in this specification in the context of separate implementations can also be implemented, in combination, in a single implementation. Conversely, various features that are described in the context of a single implementation can also be implemented in multiple implementations, separately, or in any suitable sub-combination. While operations are described and claimed in a particular order, this should not be understood as requiring that such operations be performed in the particular order shown or in sequential order, or that all illustrated operations be performed (some operations can be considered optional). As appropriate, multitasking or parallel-processing (or a combination of multitasking and parallel-processing) can be performed.

What is claimed is:
1. A computer-implemented method, comprising:
   parsing a two-dimensional (2D) code to identify a plurality of black pixels and a plurality of white pixels;
   converting the plurality of black pixels and the plurality of white pixels of the 2D code to a first plurality of binary arrays, wherein the plurality of black pixels and the plurality of white pixels correspond to different binary digits;
   parsing a target image to identify a plurality of black pixels and a plurality of white pixels, wherein the target image includes a predetermined pattern;
   converting the plurality of black pixels and the plurality of white pixels of the target image to a second plurality of binary arrays based on a predetermined rule;
   comparing at least a portion of the first plurality of binary arrays and a portion of the second plurality of binary arrays; and generating an authentication image based on comparing the portion of the first plurality of binary arrays and the portion of the second plurality of binary arrays including:
  generating black pixels in the authentication image for locations that are black in the target image but white in the 2D code,
  generating white pixels in the authentication image for locations that are white in the target image but black in the 2D code, and
  generating transparent pixels in the authentication image for locations having matching colors in the target image and in the 2D code.

2. The computer-implemented method of claim 1, wherein the predetermined rule includes converting each black pixel to binary digit 1 and converting each white pixel to binary digit 0.

3. The computer-implemented method of claim 1, wherein each binary array of the first plurality of binary arrays corresponds to a line of pixels in the 2D code.

4. The computer-implemented method of claim 1, wherein a number of pixels identified from the target image is the same as a number of pixels identified from the 2D code.

5. The computer-implemented method of claim 1, wherein a number of pixels identified from the target image is different from a number of pixels identified from the 2D code, and the number of pixels identified from the target image is converted to be the same as the number of pixels identified from the 2D code.

6. The computer-implemented method of claim 1, further comprising:
  overlapping the authentication image with the 2D code to form an overlapped image;
  determining the 2D code is unmodified if the overlapped image includes the predetermined pattern; and
  determining the 2D code is modified if the overlapped image does not include the predetermined pattern.

7. The computer-implemented method of claim 6, wherein the authentication image is printed on a transparent paper and overlapped with the 2D code printed on a paper to form the overlapped image.

8. A non-transitory, computer-readable medium storing one or more instructions executable by a computer system to perform operations comprising:
  parsing a two-dimensional (2D) code to identify a plurality of black pixels and a plurality of white pixels;
  converting the plurality of black pixels and the plurality of white pixels of the 2D code to a first plurality of binary arrays, wherein the plurality of black pixels and the plurality of white pixels correspond to different binary digits;
  parsing a target image to identify a plurality of black pixels and a plurality of white pixels, wherein the target image includes a predetermined pattern;
  converting the plurality of black pixels and the plurality of white pixels of the target image to a second plurality of binary arrays based on a predetermined rule;
  comparing at least a portion of the first plurality of binary arrays and a portion of the second plurality of binary arrays; and
  generating an authentication image based on comparing the portion of the first plurality of binary arrays and the portion of the second plurality of binary arrays, including:
    generating black pixels in the authentication image for locations that are black in the target image but white in the 2D code,
    generating white pixels in the authentication image for locations that are white in the target image but black in the 2D code, and
    generating transparent pixels in the authentication image for locations having matching colors in the target image and in the 2D code.

9. The non-transitory, computer-readable medium of claim 8, wherein the predetermined rule includes converting each black pixel to binary digit 1 and converting each white pixel to binary digit 0.

10. The non-transitory, computer-readable medium of claim 8, wherein each binary array of the first plurality of binary arrays corresponds to a line of pixels in the 2D code.

11. The non-transitory, computer-readable medium of claim 8, wherein a number of pixels identified from the target image is the same as a number of pixels identified from the 2D code.

12. The non-transitory, computer-readable medium of claim 8, wherein a number of pixels identified from the target image is different from a number of pixels identified from the 2D code, and the number of pixels identified from the target image is converted to be the same as the number of pixels identified from the 2D code.

13. The non-transitory, computer-readable medium of claim 8, further comprising:
  overlapping the authentication image with the 2D code to form an overlapped image;
  determining the 2D code is unmodified if the overlapped image includes the predetermined pattern; and
  determining the 2D code is modified if the overlapped image does not include the predetermined pattern.

14. The non-transitory, computer-readable medium of claim 13, wherein the authentication image is printed on a transparent paper and overlapped with the 2D code printed on a paper to form the overlapped image.

15. A computer-implemented system, comprising:
  one or more computers; and
  one or more computer memory devices interoperably coupled with the one or more computers and having tangible, non-transitory, machine-readable media storing one or more instructions that, when executed by the one or more computers, perform one or more operations comprising:
    parsing a two-dimensional (2D) code to identify a plurality of black pixels and a plurality of white pixels;
    converting the plurality of black pixels and the plurality of white pixels of the 2D code to a first plurality of binary arrays, wherein the plurality of black pixels and the plurality of white pixels correspond to different binary digits;
    parsing a target image to identify a plurality of black pixels and a plurality of white pixels, wherein the target image includes a predetermined pattern;
    converting the plurality of black pixels and the plurality of white pixels of the target image to a second plurality of binary arrays based on a predetermined rule;
    comparing at least a portion of the first plurality of binary arrays and a portion of the second plurality of binary arrays; and generating an authentication image based on comparing the portion of the first plurality of binary arrays and the portion of the second plurality of binary arrays, including:
- generating black pixels in the authentication image for locations that are black in the target image but white in the 2D code,
- generating white pixels in the authentication image for locations that are white in the target image but black in the 2D code, and
- generating transparent pixels in the authentication image for locations having matching colors in the target image and in the 2D code.

16. The computer-implemented system of claim 15, wherein the predetermined rule includes converting each black pixel to binary digit 1 and converting each white pixel to binary digit 0.

17. The computer-implemented system of claim 15, wherein each binary array of the first plurality of binary arrays corresponds to a line of pixels in the 2D code.

18. The computer-implemented system of claim 15, wherein a number of pixels identified from the target image is the same as a number of pixels identified from the 2D code.

19. The computer-implemented system of claim 15, wherein a number of pixels identified from the target image is different from a number of pixels identified from the 2D code, and the number of pixels identified from the target image is converted to be the same as the number of pixels identified from the 2D code.

20. The computer-implemented system of claim 15, further comprising:
- overlapping the authentication image with the 2D code to form an overlapped image;
- determining the 2D code is unmodified if the overlapped image includes the predetermined pattern; and
- determining the 2D code is modified if the overlapped image does not include the predetermined pattern.

* * * * *

UNITED STATES PATENT AND TRADEMARK OFFICE
CERTIFICATE OF CORRECTION

PATENT NO. : 10,635,959 B2
APPLICATION NO. : 15/894761
DATED : April 28, 2020
INVENTOR(S) : Wei Guo Page 1 of 1

It is certified that error appears in the above-identified patent and that said Letters Patent is hereby corrected as shown below:

In the Claims

Column 19/Line 3 – In Claim 1, delete "arrays" and insert -- arrays, --, therefor Signed and Sealed this
Twenty-seventh Day of October, 2020

Andrei Iancu
*Director of the United States Patent and Trademark Office*